(12) United States Patent
Sun et al.

(10) Patent No.: US 9,431,044 B1
(45) Date of Patent: Aug. 30, 2016

(54) SLIDER HAVING SHOCK AND PARTICLE RESISTANCE

(71) Applicant: Western Digital (Fremont), LLC, Fremont, CA (US)

(72) Inventors: Biao Sun, Fremont, CA (US); Eric T. Sladek, Pleasanton, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/307,067

(22) Filed: Jun. 17, 2014

Related U.S. Application Data

(60) Provisional application No. 61/989,617, filed on May 7, 2014.

(51) Int. Cl.
*G11B 5/60* (2006.01)
*G11B 5/187* (2006.01)

(52) U.S. Cl.
CPC ............... *G11B 5/60* (2013.01); *G11B 5/1871* (2013.01); *G11B 5/6082* (2013.01); *G11B 5/6005* (2013.01)

(58) Field of Classification Search
USPC .............. 360/235.4–235.7, 236.3–236.5, 237
See application file for complete search history.

(56) References Cited

U.S. PATENT DOCUMENTS

| 5,490,025 | A | 2/1996 | Dorius et al. |
|---|---|---|---|
| 5,940,249 | A | 8/1999 | Hendriks |
| 6,075,673 | A | 6/2000 | Wilde et al. |
| 6,097,575 | A | 8/2000 | Trang et al. |
| 6,125,014 | A | 9/2000 | Riedlin, Jr. |
| 6,125,015 | A | 9/2000 | Carlson et al. |
| 6,130,863 | A | 10/2000 | Wang et al. |
| 6,137,656 | A | 10/2000 | Levi et al. |
| 6,144,528 | A | 11/2000 | Anaya-Dufresne et al. |
| 6,147,838 | A | 11/2000 | Chang et al. |
| 6,151,196 | A | 11/2000 | Carlson et al. |
| 6,178,064 | B1 | 1/2001 | Chang et al. |
| 6,181,522 | B1 | 1/2001 | Carlson |
| 6,181,673 | B1 | 1/2001 | Wilde et al. |
| 6,229,672 | B1 | 5/2001 | Lee et al. |
| 6,236,543 | B1 | 5/2001 | Han et al. |
| 6,246,547 | B1 | 6/2001 | Bozorgi et al. |
| 6,249,404 | B1 | 6/2001 | Doundakov et al. |
| 6,330,131 | B1 | 12/2001 | Nepela et al. |
| 6,339,518 | B1 | 1/2002 | Chang et al. |
| 6,349,017 | B1 | 2/2002 | Schott |
| 6,373,660 | B1 | 4/2002 | Lam et al. |
| 6,378,195 | B1 | 4/2002 | Carlson |
| 6,522,504 | B1 | 2/2003 | Casey |
| 6,538,850 | B1 | 3/2003 | Hadian et al. |
| 6,583,953 | B1 | 6/2003 | Han et al. |
| 6,646,832 | B2 | 11/2003 | Anaya-Dufresne et al. |
| 6,661,612 | B1 | 12/2003 | Peng |

(Continued)

OTHER PUBLICATIONS

Jih-Ping Peng, et al., U.S. Appl. No. 13/893,188, filed May 13, 2013, 15 pages.

(Continued)

*Primary Examiner* — Carlos E Garcia

(57) ABSTRACT

A slider for a hard disk includes a leading structure having a first air bearing surface portion, a trailing structure having a second air bearing surface portion, and a cavity between the leading structure and the trailing structure. The leading structure has one or more interior walls defining a pit therein. A hard disk drive includes a rotatable magnetic recording disk and the slider.

28 Claims, 4 Drawing Sheets

(56) References Cited

U.S. PATENT DOCUMENTS

| | | |
|---|---|---|
| 6,665,146 B2 | 12/2003 | Hawwa et al. |
| 6,690,545 B1 | 2/2004 | Chang et al. |
| 6,704,173 B1 | 3/2004 | Lam et al. |
| 6,708,389 B1 | 3/2004 | Carlson et al. |
| 6,717,773 B2 | 4/2004 | Hawwa et al. |
| 6,721,142 B1 | 4/2004 | Meyer et al. |
| 6,744,599 B1 | 6/2004 | Peng et al. |
| 6,747,847 B2 | 6/2004 | Stoebe et al. |
| 6,771,468 B1 | 8/2004 | Levi et al. |
| 6,796,018 B1 | 9/2004 | Thornton |
| 6,801,402 B1 | 10/2004 | Subrahmanyam et al. |
| 6,809,904 B2 | 10/2004 | Boutaghou et al. |
| 6,856,489 B2 | 2/2005 | Hawwa et al. |
| 6,873,496 B1 | 3/2005 | Sun et al. |
| 6,879,464 B2 | 4/2005 | Sun et al. |
| 6,912,103 B1 | 6/2005 | Peng et al. |
| 6,920,015 B2 | 7/2005 | Mundt et al. |
| 6,937,439 B1 | 8/2005 | Chang et al. |
| 6,956,718 B1 | 10/2005 | Kulkarni et al. |
| 6,972,930 B1 | 12/2005 | Tang et al. |
| 6,980,399 B2 | 12/2005 | Rajakumar et al. |
| 7,006,330 B1 | 2/2006 | Subrahmanyam et al. |
| 7,006,331 B1 | 2/2006 | Subrahmanyam et al. |
| 7,010,847 B1 | 3/2006 | Hadian et al. |
| 7,019,945 B1 | 3/2006 | Peng et al. |
| 7,027,264 B1 | 4/2006 | Subrahmanyam et al. |
| 7,085,104 B1 | 8/2006 | Hadian et al. |
| 7,099,114 B2 | 8/2006 | Kang |
| 7,099,117 B1 | 8/2006 | Subrahmanyam et al. |
| 7,174,622 B2 | 2/2007 | Meyer et al. |
| 7,230,797 B1 | 6/2007 | Liu |
| 7,256,965 B2 | 8/2007 | Rao et al. |
| 7,277,255 B2 | 10/2007 | Ueno et al. |
| 7,289,299 B1 | 10/2007 | Sun et al. |
| 7,307,816 B1 | 12/2007 | Thornton et al. |
| 7,315,435 B1 | 1/2008 | Pan |
| 7,315,436 B1 | 1/2008 | Sanchez |
| 7,339,766 B2 | 3/2008 | Yao et al. |
| 7,408,742 B2 | 8/2008 | Kameyama |
| 7,414,814 B1 | 8/2008 | Pan |
| 7,436,631 B1 | 10/2008 | Fanslau, Jr. et al. |
| 7,474,508 B1 | 1/2009 | Li et al. |
| 7,477,486 B1 | 1/2009 | Sun et al. |
| 7,525,763 B2 | 4/2009 | Yao et al. |
| 7,593,190 B1 | 9/2009 | Thornton et al. |
| 7,595,963 B1 | 9/2009 | Chen et al. |
| 7,616,405 B2 | 11/2009 | Hu et al. |
| 7,719,795 B2 | 5/2010 | Hu et al. |
| 7,729,089 B1 | 6/2010 | Hogan |
| 7,855,854 B2 | 12/2010 | Hu et al. |
| 7,872,833 B2 | 1/2011 | Hu et al. |
| 7,916,426 B2 | 3/2011 | Hu et al. |
| 7,995,310 B1 | 8/2011 | Pan |
| 8,081,400 B1 | 12/2011 | Hu |
| 8,087,973 B1 | 1/2012 | Sladek et al. |
| 8,089,730 B1 | 1/2012 | Pan et al. |
| 8,116,037 B2 * | 2/2012 | Kohira et al. ............. 360/235.7 |
| 8,164,858 B1 | 4/2012 | Moravec et al. |
| 8,169,744 B1 | 5/2012 | Dorius |
| 8,174,794 B2 | 5/2012 | Dorius |
| 8,199,437 B1 | 6/2012 | Sun et al. |
| 8,208,224 B1 | 6/2012 | Teo et al. |
| 8,218,268 B1 | 7/2012 | Pan |
| 8,240,545 B1 | 8/2012 | Wang et al. |
| 8,256,272 B1 | 9/2012 | Roajanasiri et al. |
| 8,289,653 B2 | 10/2012 | Huang |
| 8,295,012 B1 | 10/2012 | Tian et al. |
| 8,295,013 B1 | 10/2012 | Pan et al. |
| 8,295,014 B1 | 10/2012 | Teo et al. |
| 8,320,082 B2 * | 11/2012 | Hanyu ...................... 360/236.2 |
| 8,320,084 B1 | 11/2012 | Shum et al. |
| 8,325,446 B1 | 12/2012 | Liu et al. |
| 8,325,447 B1 | 12/2012 | Pan |
| 8,339,742 B1 | 12/2012 | Sladek et al. |
| 8,339,747 B1 | 12/2012 | Hales et al. |
| 8,339,748 B2 | 12/2012 | Shum et al. |
| 8,343,363 B1 | 1/2013 | Pakpum et al. |
| 8,345,519 B1 | 1/2013 | Pan |
| 8,418,353 B1 | 4/2013 | Moravec et al. |
| 8,427,784 B2 * | 4/2013 | Sonoda ...................... 360/235.7 |
| 8,441,896 B2 | 5/2013 | Wang et al. |
| 8,446,694 B1 | 5/2013 | Tian et al. |
| 8,456,643 B2 | 6/2013 | Prabhakaran et al. |
| 8,456,776 B1 | 6/2013 | Pan |
| 8,462,462 B1 | 6/2013 | Moravec et al. |
| 8,477,459 B1 | 7/2013 | Pan |
| 8,485,579 B2 | 7/2013 | Roajanasiri et al. |
| 8,488,279 B1 | 7/2013 | Pan et al. |
| 8,488,281 B1 | 7/2013 | Pan |
| 8,490,211 B1 | 7/2013 | Leary |
| 8,514,522 B1 | 8/2013 | Pan et al. |
| 8,533,936 B1 | 9/2013 | Puttichaem et al. |
| 8,545,164 B2 | 10/2013 | Choumwong et al. |
| 8,553,365 B1 | 10/2013 | Shapiro et al. |
| 8,587,901 B1 | 11/2013 | Puttichaem et al. |
| 8,593,764 B1 | 11/2013 | Tian et al. |
| 8,599,653 B1 | 12/2013 | Mallary et al. |
| 8,605,389 B1 | 12/2013 | Pan et al. |
| 8,611,050 B1 | 12/2013 | Moravec et al. |
| 8,611,051 B1 * | 12/2013 | Hanyu ...................... 360/236.3 |
| 8,611,052 B1 | 12/2013 | Pan et al. |
| 8,623,197 B1 | 1/2014 | Kobsiriphat et al. |
| 8,624,184 B1 | 1/2014 | Souza et al. |
| 8,665,566 B1 | 3/2014 | Pan et al. |
| 8,665,567 B2 | 3/2014 | Shum et al. |
| 8,665,677 B1 | 3/2014 | Panitchakan et al. |
| 8,665,690 B1 | 3/2014 | Moravec et al. |
| 8,693,144 B1 | 4/2014 | Pan et al. |
| 8,756,795 B1 | 6/2014 | Moravec et al. |
| 8,758,083 B1 | 6/2014 | Rudy et al. |
| 8,760,812 B1 | 6/2014 | Chen et al. |
| 8,770,463 B1 | 7/2014 | Puttichaem et al. |
| 8,773,664 B1 | 7/2014 | Wang et al. |
| 8,792,212 B1 | 7/2014 | Pan et al. |
| 8,792,213 B1 | 7/2014 | Vijay et al. |
| 8,797,691 B1 | 8/2014 | Tian et al. |
| 8,814,405 B2 | 8/2014 | Takahashi et al. |
| 2003/0058578 A1 * | 3/2003 | Boutaghou et al. ........ 360/235.8 |
| 2003/0165031 A1 | 9/2003 | Rajakumar |
| 2004/0012887 A1 | 1/2004 | Rajakumar et al. |
| 2004/0027724 A1 | 2/2004 | Pendray et al. |
| 2004/0150916 A1 | 8/2004 | Rao et al. |
| 2004/0156143 A1 | 8/2004 | Kang |
| 2005/0105216 A1 | 5/2005 | Ueno et al. |
| 2007/0103816 A1 | 5/2007 | Nakakita et al. |
| 2007/0195461 A1 | 8/2007 | Kajitani |
| 2008/0198509 A1 * | 8/2008 | Bolasna et al. ............. 360/235.5 |
| 2009/0109572 A1 * | 4/2009 | Watanabe .................. 360/235.4 |
| 2009/0310258 A1 * | 12/2009 | Hanyu et al. ............... 360/235.4 |
| 2010/0149692 A1 * | 6/2010 | Fujimaki et al. ........... 360/235.8 |
| 2011/0032641 A1 * | 2/2011 | Ookubo et al. ............. 360/235.5 |
| 2011/0141622 A1 * | 6/2011 | Takeuchi .................... 360/235.4 |
| 2011/0195275 A1 | 8/2011 | Huha et al. |
| 2012/0002327 A1 * | 1/2012 | Hanyu ...................... 360/235.6 |
| 2012/0099225 A1 * | 4/2012 | Ambekar et al. .......... 360/236.4 |
| 2012/0275063 A1 * | 11/2012 | Sonoda ...................... 360/236.5 |
| 2013/0244541 A1 | 9/2013 | Yaemglin et al. |
| 2013/0293982 A1 | 11/2013 | Huber |

OTHER PUBLICATIONS

B. Marchon, et al., Lubricant dynamics on a slider: "The waterfall effect," Journal of Applied Physics 105, 074313, Apr. 7, 2009.

W A. Challener, et al., "Heat-Assisted Magnetic Recording by a Near-Field Transducer With Efficient Optical Energy Transfer", www.nature.com/naturephotonics, Nature Photonics, vol. 3, Apr. 2009 (published online: Mar. 2009), pp. 220-224.

Jia-Yang Juang, et al., "Alternate Air Bearing Slider Designs for Areal Density of 1 Tb/in2", IEEE Transactions on Magnetics, vol. 42, No. 2, Feb. 2006, pp. 241-246.

(56) References Cited

OTHER PUBLICATIONS

B. Strom, et al., "Burnishing Heads In-Drive for Higher Density Recording", IEEE Transactions on Magnetics, vol. 40, No. 1, Jan. 2004, pp. 345-348.

Gurinder P. Singh, et al., "A Novel Wear-In-Pad Approach to Minimizing Spacing at the Head/Disk Interface", IEEE Transactions on Magnetics, vol. 40, No. 4, Jul. 2004, pp. 3148-3152.

* cited by examiner

SLIDER HAVING SHOCK AND PARTICLE RESISTANCE

CROSS-REFERENCE TO RELATED APPLICATION

This application claims the benefit of U.S. Provisional Application Ser. No. 61/989,617, filed on May 7, 2014, which is expressly incorporated by reference herein in its entirety.

BACKGROUND

Information storage devices are used to retrieve and/or store data in computers and other consumer electronics devices. A magnetic hard disk drive is an example of an information storage device that includes one or more heads that can both read and write.

In magnetic hard disk drives, each read head typically comprises a body called a "slider" that carries a magnetic transducer on its trailing end. The magnetic transducer typically comprises a writer and a read element. The magnetic transducer's writer may be of a longitudinal or perpendicular design, and the read element of the magnetic transducer may be inductive or magnetoresistive (e.g. so-called "giant" magneto-resistive read element, tunneling magneto-resistive read element, etc). In a magnetic hard disk drive, the transducer is typically supported in very close proximity to the magnetic disk by a hydrodynamic air bearing. As the motor rotates the magnetic disk, the hydrodynamic air bearing is formed between an air bearing surface of the slider of the read head, and a surface of the magnetic disk. The thickness of the air bearing at the location of the transducer is commonly referred to as "flying height."

Magnetic hard disk drives are not the only type of information storage devices that have utilized air bearing sliders. For example, air bearing sliders have also been used in optical information storage devices to position a mirror and an objective lens for focusing laser light on the surface of disk media that is not necessarily magnetic.

The flying height is a parameter that affects the performance of an information storage device. If the flying height is too high, the ability of the transducer to write and/or read information to/from the disk surface may be substantially degraded. Therefore, reductions in flying height can facilitate desirable increases in the areal density of data stored on a disk surface. However, it is not beneficial to eliminate the air bearing between the slider and the disk surface entirely, because the air bearing serves to reduce friction and wear (between the slider and the disk surface) to an acceptable level. Excessive reduction in the nominal flying height may degrade the tribological performance of the disk drive to the point where the lifetime and reliability of the disk drive become unacceptable.

Another factor that can adversely affect the tribological performance of the read head, and therefore also adversely affect the disk drive's lifetime and reliability, is the extent to which particulate debris can enter the air bearing during operation. Because the thickness of the air bearing is just a few tens of nanometers or less (typically minimum at the trailing edge of the slider because of the slider's positive pitch angle), even small debris particles can be large enough to interfere with the desired spacing between the air bearing surface and the disk surface. Such particulate debris that enter into the air bearing can undesirably cause abrupt thermal disturbances to the read element and/or temporarily change the flying characteristics of the slider, potentially causing immediate reading or writing errors. Such debris that enter into the air bearing can also drag along the disk surface and possibly damage the disk surface, potentially destroying data and/or leading to future tribological failure (e.g. head crash).

Air bearing features that discourage the entry of particulate debris have been proposed before. However, past air bearing design features that discourage the entry of particulate debris have been detrimental to the flying characteristics of the slider, for example reducing super-ambient pressure in key regions of the air bearing and thereby unacceptably reducing the load carrying capacity of the air bearing. Certain such design features can also adversely affect the ability of the air bearing to maintain an acceptable roll angle in the face of expected changes to the skew angle of the slider (relative to the direction of disk surface motion). Such skew angle changes are expected as the actuator positions the read head to different disk radii. The shortcomings of contemporary air bearing design features to discourage entry of particles may be exacerbated in sliders having a smaller air bearing area, such as newer smaller-form factor sliders (e.g. the so-called "femto" form factor).

Accordingly, what is needed in the art is an air bearing design that can discourage the entry of particulate debris while maintaining acceptable air bearing performance characteristics even in small form factor sliders.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
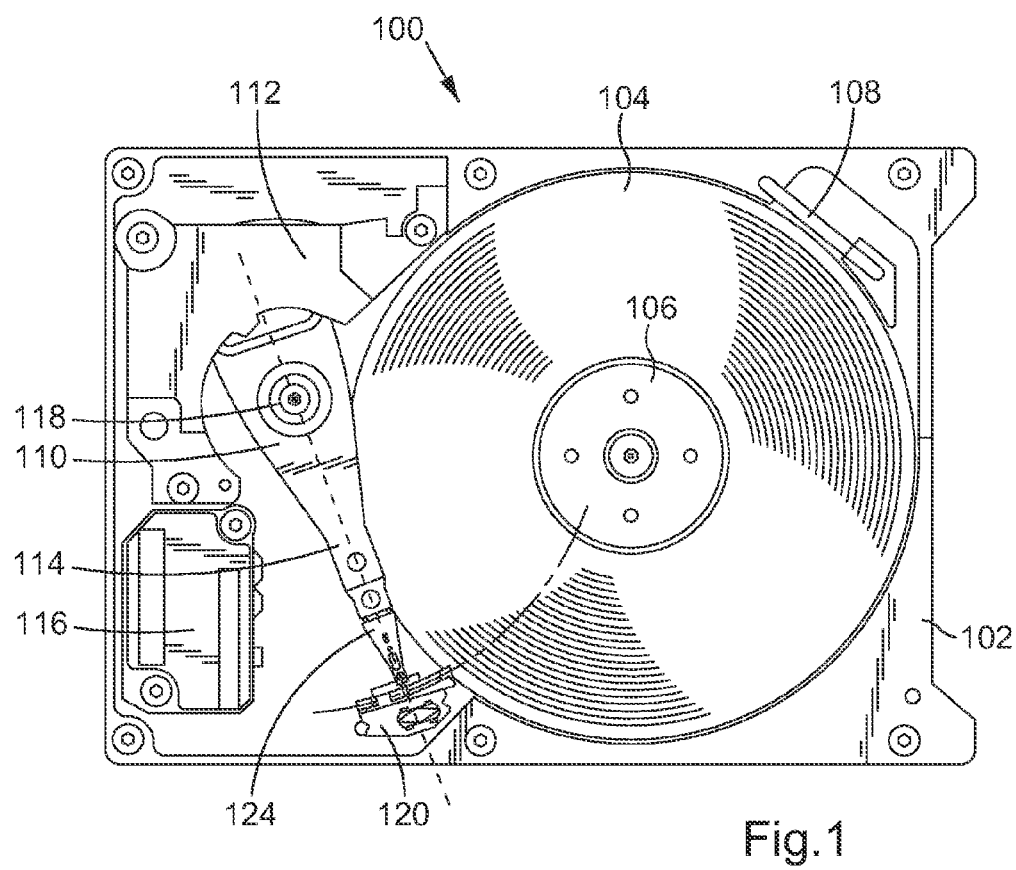
FIG. 1 is a top view of an exemplary embodiment of a hard disk drive.

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The various aspects of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus or method.

The word "exemplary" is used herein to mean serving as an example, instance, or illustration. Any embodiment described herein as "exemplary" is not necessarily to be construed as preferred or advantageous over other embodiments. Likewise, the term "embodiment" of an apparatus, method or article of manufacture does not require that all embodiments of the invention include the described components, structure, features, functionality, processes, advantages, benefits, or modes of operation.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element.

As used herein, the terms "comprises," "comprising," "includes," and/or "including," when used herein, specify the presence of the stated features, integers, steps, operations, elements, and/or components, but do not preclude the presence or addition of one or more other features, integers, steps, operations, elements, components, and/or groups thereof.

As used herein, the term "about" followed by a numeric value means within engineering tolerance of the provided value.

In the following detailed description, various aspects of the present invention will be presented in the context a slider for a hard disk drive (HDD). However, those skilled in the art will realize that these aspects may be extended to any suitable application where air bearing sliders are implemented. Accordingly, any reference to a slider as part of an HDD is intended only to illustrate the various aspects of the present invention, with the understanding that such aspects may have a wide range of applications.

Aspects of a slider for a hard disk includes a leading structure having a first air bearing surface portion, a trailing structure having a second air bearing surface portion, and a cavity between the leading structure and the trailing structure. The leading structure has one or more interior walls defining a pit therein.

Aspects of a hard disk drive include a rotatable magnetic recording disk and a slider for use with the magnetic recording disk. The slider includes a leading structure having a first air bearing surface portion, a trailing structure having a second air bearing surface portion, and a cavity between the leading structure and the trailing structure. The leading structure has one or more interior walls defining a pit therein.

FIG. 1 shows a hard disk drive 100 including a disk drive base 102, at least one disk 104 (such as a magnetic disk, magneto-optical disk, or optical disk), a spindle motor 106 attached to the base 102 for rotating the disk 104, and a head stack assembly (HSA) 110. The spindle motor 106 typically includes a rotating hub on which disks are mounted and clamped, a magnet attached to the hub, and a stator. Various coils of the stator are selectively energized to form an electromagnetic field that pulls/pushes on the magnet, thereby rotating the hub. Rotation of the spindle motor hub results in rotation of the mounted disks. The HSA 110 typically includes at least one actuator arm 114, and at least one head gimbal assembly (HGA) 124 that includes a read head.

During operation of the disk drive, the HSA 110 rotates to position the read head along an arc adjacent desired information tracks on the disk 104. The HSA 110 includes a pivot bearing cartridge 118 to facilitate such rotational positioning. The HSA 110 typically includes a voice coil that interacts with one or more fixed magnets on a magnetic yoke 112, to rotate the HSA 110. For example, when the HSA 110 is rotated such that the HGA 124 leaves a ramp 120, the read head is loaded onto a surface of the disk 104. Other disk drive components shown in FIG. 1 include a flex cable bracket 116 and a recirculation air filter 108.

Figure 2:
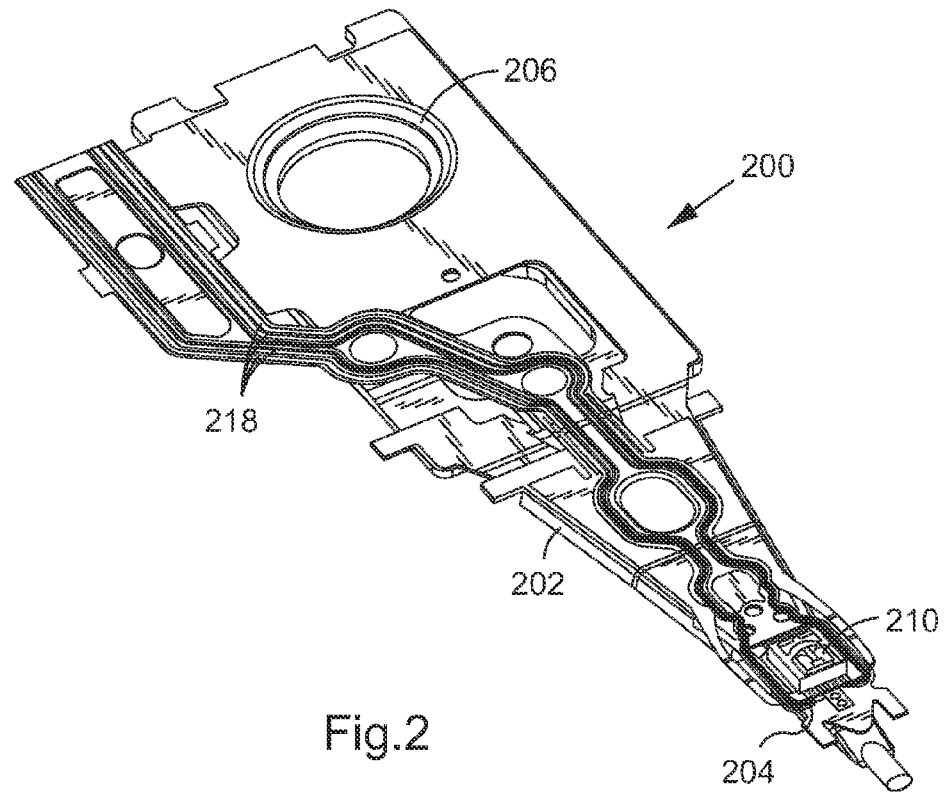
FIG. 2 is an exemplary embodiment of a head gimbal assembly including an exemplary embodiment of a slider.

FIG. 2 shows a head gimbal assembly (HGA) 200 that includes a load beam 202, a laminated flexure 204, and a swage mount 206. The HGA 200 also includes a slider 210 in accordance with an embodiment of the present invention, which is bonded to a tongue of the laminated flexure 204. The laminated flexure 204 provides structural support and compliance to the slider 210, and also provides a plurality of electrically conductive traces 218, preferably including traces for carrying electrical signals from/to a read/write transducer of head 210.

Figure 3:
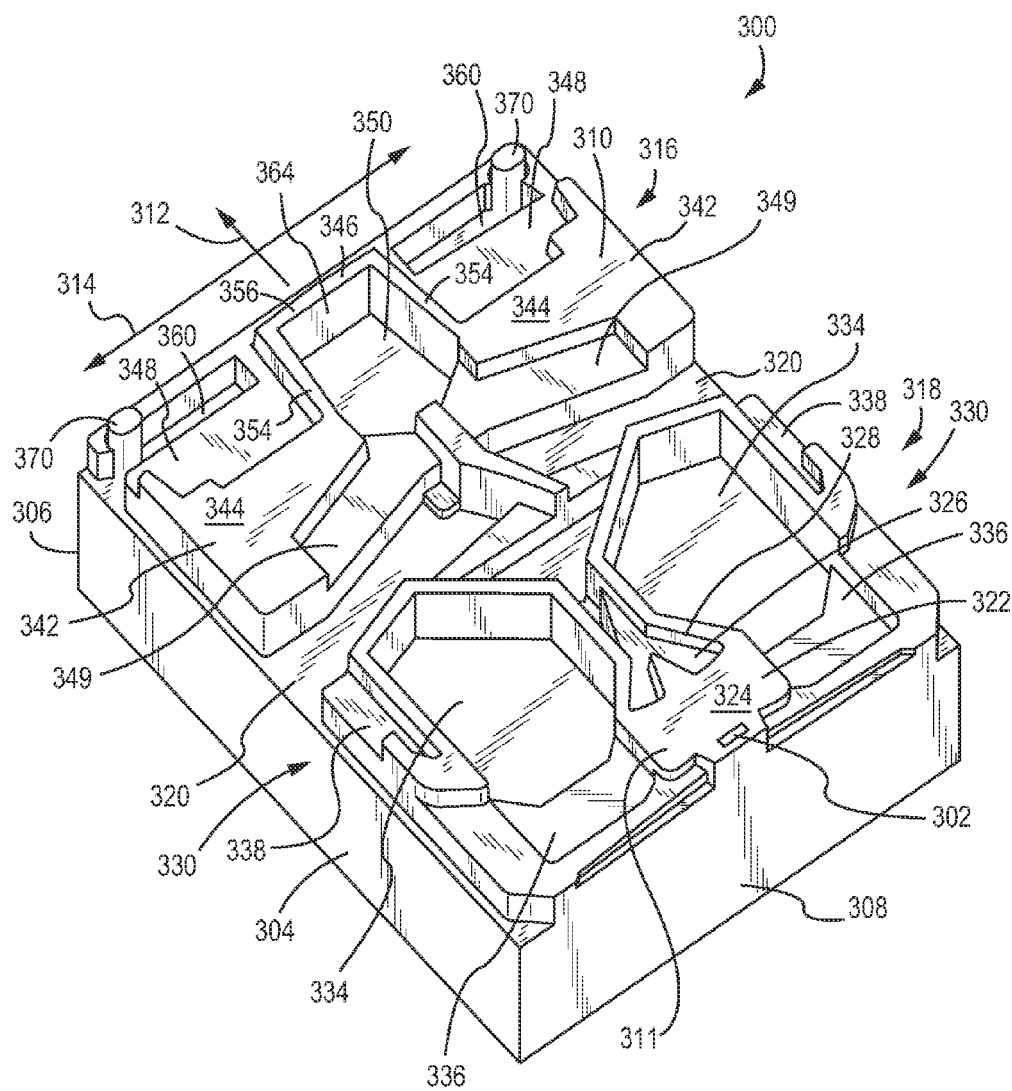
FIG. 3 is a perspective view of an exemplary embodiment of a slider.
Figure 4:
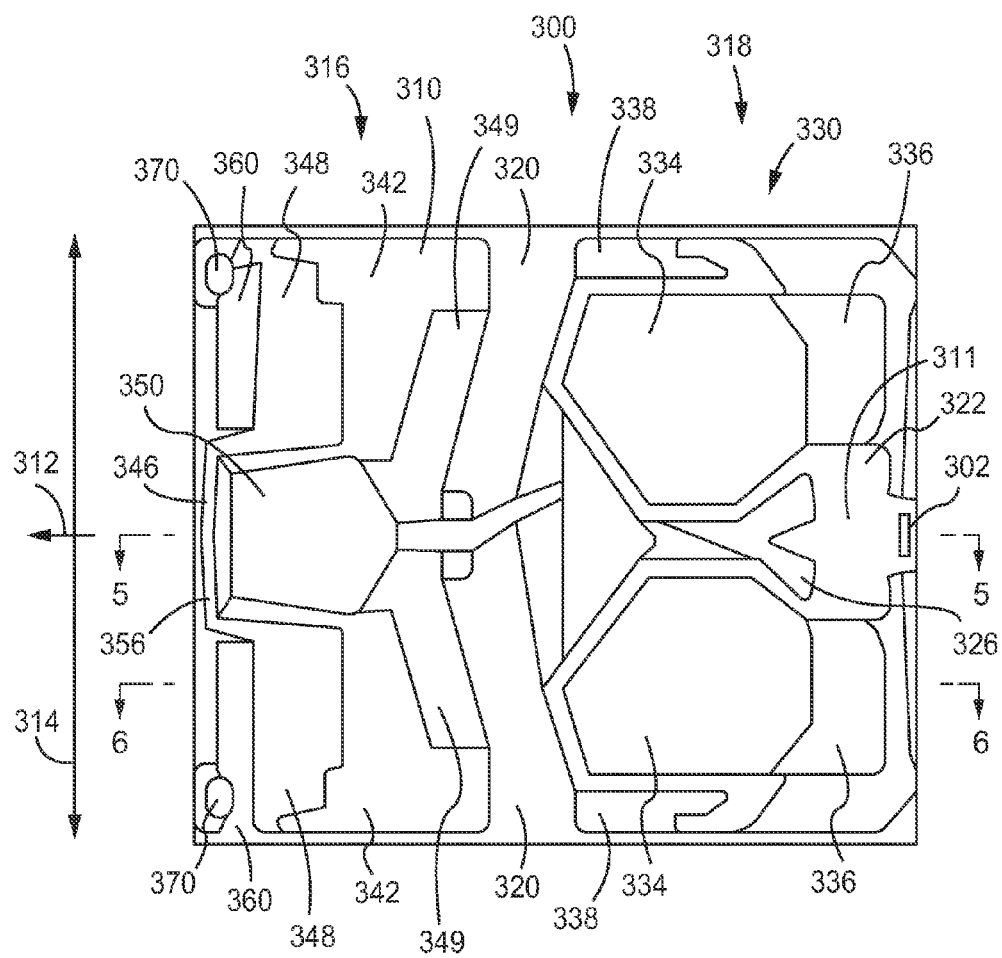
FIG. 4 is a plan view of the exemplary embodiment of the slider of FIG. 3.

FIG. 3 is a perspective view of an exemplary embodiment of a slider 300. The slider features are not to scale but rather are exaggerated so as to be easily discernible. FIG. 4 is a plan view of the slider 300. Referring to FIGS. 3 and 4, the slider 300 may include a transducer 302 for at least reading information from an adjacent disk surface. The slider 300 may also include a base 304, which is typically fabricated from a ceramic material such as alumina titanium carbide. The slider 300 may have a leading edge 306 and a trailing edge 308 that is opposite the leading edge. The slider 300 may also have a first air bearing surface portion 310 and a second air bearing surface portion 311, each of which is normal to the trailing edge 308. Other devices and transducers (e.g. a slider based microactuator, a heater for protrusion control, etc) may also be disposed on or adjacent the trailing face, in addition to the read transducer. For example, the read transducer may be part of a merged transducer that also includes a write transducer.

The air bearing surface 310 defines an upstream direction (e.g. 312) pointing from the trailing edge 308 to the leading edge 306. The term "upstream" is used herein only to define a directional convention to facilitate description of relative positions on the air bearing surface, and does not require the presence or existence of any stream. For example, "upstream" can be understood to refer to a range of directions across the air bearing surface 310 that generally point away from the trailing edge 308 and towards the leading edge 306. As such, in disk drive applications, upstream directions would ultimately be generally opposite the motion of an adjacent rotating disk surface. An upstream direction would be a direction within the aforementioned range. The term "downstream" is used herein as an antonym of "upstream."

For each upstream direction, the air bearing surface 310 defines a lateral axis that is orthogonal to that upstream direction. For example, for a zero-skew upstream direction 312 that is parallel to the air bearing surface 310, the air bearing surface 310 defines a corresponding lateral axis 314 that is parallel to the leading edge 306 or the trailing edge 308 (i.e. orthogonal to that upstream direction). The width of the slider can be measured along lateral axis. For example, so-called "femto" form factor sliders would then typically have a width of 0.70 mm and a length of 0.85 mm, while so-called "pico" form factor sliders would then typically have a width of 1.00 mm and a length of 1.25 mm. Non-zero skew upstream directions are also contemplated herein. As noted above, the features of air bearing surface are not to scale in FIG. 3, but rather are vertically exaggerated (i.e. exaggerated in a direction normal to both the upstream direction and the lateral axis) so as to be easily discernible.

In the exemplary embodiment of FIGS. 3 and 4, the slider 300 may include a leading structure 316 and a trailing structure 318, which may be separated by deep cavities 320, also referred herein as sub-ambient pressure cavities 320. The deep cavities 320 may be located between and separate the leading structure 316 from the trailing structure 318. The deep cavities 320 may provide an area of sub-ambient pressure in operation. The trailing structure 318 may include a trailing pad 322. The trailing pad 322 may include a surface 324 adjacent the read transducer 302. As shown in FIG. 3, the surface 324 of the trailing pad 322 may lie in a plane, where the plane is the farthest plane from the slider body 304 relative to the other features of the slider 300. The term "plane" used herein thus refers to the plane in which the surface 324 of the trailing pad 322 lies. For example, the plane in which the surface 324 lies may be the closest plane to the media relative in use, relative to the other slider features. The air bearing surface 310 is located along the surface 324 and thus lies in the plane. The sub-ambient pressure cavities 320 may be recessed relative to the plane/air bearing surface 310 by about 500 nm or more.

The transducer 302 may include an overcoat material (e.g. alumina) that is incidentally slightly recessed from the plane, because alumina may etch away more rapidly than does alumina titanium carbide during fabrication of the air bearing. During operation, the trailing pad 322 may develop a super-ambient pressure region between the air bearing surface and the surface of an adjacent disk that can help maintain a desired flying height at the location of transducer. For example, in the embodiment of FIGS. 3 and 4, the trailing pad 322 may create a region of high pressure, including the highest pressure generated by the air bearing surface 310 during normal operation of the head.

In the exemplary embodiment of FIGS. 3 and 4, a pressurizing step 326 may located upstream of the trailing pad 322. The pressurizing step 326 preferably includes a surface that is recessed relative to the plane/air bearing surface by about 100 nm to about 250 nm. During operation, the pressurizing step 326 can enhance the super-ambient pressure between the trailing pad 322 and the surface of an adjacent disk. Such enhanced pressurization may reduce the surface area required for the trailing pad 322.

In the exemplary embodiment of FIGS. 3 and 4, in addition to the deep sub-ambient cavities 320, the air bearing surface 310 may include stepped sub-ambient pressure cavities 330. The stepped sub-ambient pressure cavities 330 may include two distinct portions of different depth: a deep portion 334 and a shallow portion 336. The deep portion 334 of the stepped sub-ambient pressure cavities 330 may be recessed relative to the plane/air bearing surface by about 800 nm or more, for example from about 800 to about 2000 nm. The deep portion 334 may be less recessed as compared to a pit 350, which is discussed in more detail below. The shallow portion 336 of the stepped sub-ambient pressure cavities 330 may be recessed relative to the plane/air bearing surface by about 300 nm or more, for example from about 300 nm to about 800 nm. The shallow portion 336 may be more recessed than the pressuring step 326. As shown in FIGS. 3 and 4, the shallow portion 336 may be located downstream of the deep portion 334 and adjacent to the trailing pad 322. During operation, one or more of these sub-ambient pressure cavities 320, 330 can develop a sub-ambient pressure region between the air bearing surface 310 and the surface of an adjacent disk. The sub-ambient pressure may serve to reduce flying height sensitivities to changes in altitude and air bearing geometries. The stepped sub-ambient pressure cavities 330 have been found to provide an optimal balance between shock damage prevention and maintaining altitude performance.

In the exemplary embodiment of FIGS. 3 and 4, the leading structure 326 of the air bearing surface 310 may include two leading pads 342 also having a surface 344 in the plane (i.e., the surface 344 is in the same plane as the surface 324) and disposed upstream of the sub-ambient pressure cavities 320. The two leading pads 342 together may span at least 60% of the width of the slider. Preferably but not necessarily, the two leading pads 342 may be shaped and adjoined together to form a shape like a letter W that is oriented so that the center peak 346 of the W points in the upstream direction, as shown in FIGS. 3 and 4. The center peak 346 of the W may have a substantially rectangular U shape (e.g., two vertical legs 354 joined by a horizontal base leg 356) so as to define a pit 350, which is described in more detail below. Furthermore, as shown in FIGS. 3 and 4, the center peak 346 of the W may terminate at the leading edge 306. During operation, the leading pads 342 can develop a super-ambient pressure region between the air bearing surface 310 and the surface of an adjacent disk, causing the slider to assume a positive pitch attitude. In the exemplary embodiment of FIGS. 3 and 4, the leading pads also include leading pressurizing steps 348. The leading pressurizing steps 348 preferably include a surface that is recessed relative to plane/air bearing surface by about 100 nm or more, for example between about 100 nm to about 250 nm. During operation, the leading pressurizing steps 348 can help develop super-ambient pressure between the leading pads 342 and the surface of an adjacent disk.

In the exemplary embodiment of FIGS. 3 and 4, the leading pads also include secondary leading pressurizing steps 349 and trailing pressurizing steps 338. The secondary leading pressurizing steps 349 and the trailing pressuring steps 338 preferably include surfaces that are recessed relative to the plane/air bearing surface by about 100 nm or more, for example between about 100 nm to about 250 nm. During operation, the secondary leading pressurizing steps 349 can help develop super-ambient pressure between the leading pads 342 and the surface of an adjacent disk.

In the exemplary embodiment of FIGS. 3 and 4, the slider 300 includes trenches 360 disposed upstream of the leading pads 342. The trenches 360 may be recessed relative to the plane/air bearing surface by about 600 nm or more, preferably about 800 nm or more. For example the trenches may be recessed by about 600 nm to about 2000 nm, more preferably from about 800 nm to about 1500 nm. As shown in FIGS. 3 and 4, the trenches 360 may be disposed adjacent to the center peak 346 of the leading pads 342. For example, the trenches 360 may be disposed adjacent the base leg 356 of the rectangular U shape (e.g., may extend parallel to the base leg 356). Thus, in an exemplary embodiment, the trenches 360 are non-continuous (e.g., comprise two separate trenches). Each of the trenches 360 may extend about ⅓ the width of the slider base 304. Thus, together, the trenches 360 may extend about ⅔ the width of the slider base 304. The trenches 360 may help facilitate control of the so-called "roll profile." The roll profile is the variation of slider roll angle, over a range of skew angles and velocities (relative to the motion of an adjacent disk) that correspond to variation in the position of the slider from the disk inner diameter to the disk outer diameter during operation of the disk drive. Typically, "flattening" of the roll profile (e.g. less variation of slider roll versus skew angle and/or velocity changes), is desirable. In the exemplary embodiment of FIGS. 3 and 4, the trenches 360 may have an extent measured along the upstream direction that is at least 25 microns and no more than 8% of the total slider length measured along the upstream direction. These dimensional limits may avoid undesirable fabrication process consequences (e.g. due to tolerance stack-up), and/or to allow air flow having a lateral component through the trenches (sufficiently to adequately pressurize the air bearing surface).

In the exemplary embodiment of FIGS. 3 and 4, the slider 300 may include a pit 350 recessed relative to the plane/air bearing surface and disposed adjacent the leading face 306. In this context, "adjacent" means only that there is no air bearing feature in the plane that is closer than the "adjacent" feature. The pit 350 helps prevent particulate contamination from entering the air bearing and also increases shock resistance. The pit 350 may be recessed relative to the plane/air bearing surface by about 600 nm or more, more preferably about 1000 nm or more. For example, the pit may be recessed from about 600 nm to about 2500 nm, more preferably from about 1000 nm to about 2000 nm. The pit 350 may be recessed by the same amount or greater than the recess of the trenches 360. The pit 350 may have a polygonal shape. In the exemplary embodiment shown in FIGS. 3 and 4, the pit 350 is formed as a six sided polygon, i.e., a hexagon. As shown in FIGS. 3 and 4, the pit 350 may be an irregular hexagon, i.e., not all of the sides have the same length. The pit 350 may continuously laterally span at least 25% of the width of the slider base 304. This size may ensure adequate particle capture over a practical range of skew angles, while allowing sufficient airflow around the pit to adequately pressurize the air bearing surface over a practical range of skew angles. As shown in FIG. 3, the pit 350 may be at least partially defined the leading pad 342 of the leading structure 316. For example, as shown in FIGS. 3 and 4, three of the side walls defining the pit are part of the leading pad 342 and lie in the plane/air bearing surface. As also shown in FIG. 3, the pit 350 may be at least partially defined by the steps 349 of the leading structure. For example, as shown in FIGS. 3 and 4, two of the side walls defining the pit 350 may be part of the steps 349. Thus, the walls that define the pit 350 may be interior walls of the leading structure 316. The pit 350 may be centered along the width of the slider base 304.

In the exemplary embodiment of FIGS. 3 and 4, the pit 350 preferably has an extent measured along the upstream direction that is about 50 to about 100 microns and about 10-20% of the total slider base 304 length measured along the upstream direction. These dimensional limits may avoid undesirable fabrication process consequences (e.g. due to tolerance stack-up), and/or to allow sufficient air flow having a lateral component immediately downstream of the pit, to adequately pressurize the air bearing surface.

It has been found that the combination of the pit 350 and trenches 360 adequately captures particles and increase shock resistance. The pit 350 in particular contributes to shock resistance. It has been found that the combination of trenches 360 and the pit 350 at the leading edge 306 increases the suction force and damping, thus increasing shock resistance.

In the embodiment of FIGS. 3 and 4, the slider 300 optionally may include two leading outboard dots 370 in the primary plane. Each leading outboard dot 370 preferably defines a dot radius in the range 10 microns to 45 microns. Each leading outboard dot 370 is adjacent the leading face 306, adjacent a corner of the air bearing surface 310, and laterally adjacent a trench 360. During operation, the leading outboard dots 370 may serve to prevent damage to the head disk interface under certain conditions that would otherwise lead to contact between a corner of the slider and an adjacent disk surface.

Figure 5:
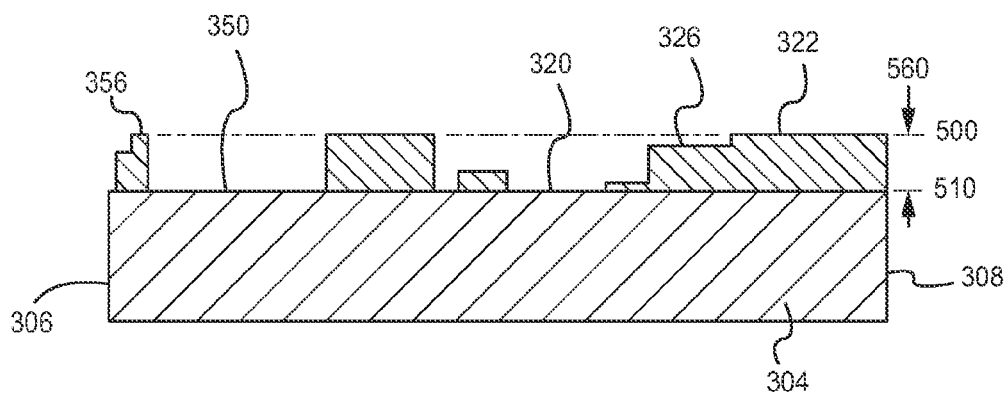
FIG. 5 is a cross section view of the exemplary embodiment of the slider of FIG. 4 taken along line 5-5.
Figure 6:
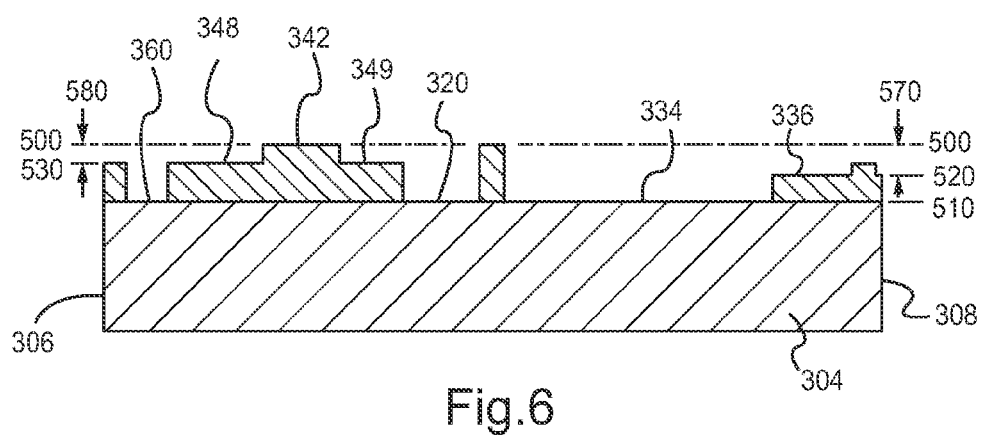
FIG. 6 is a cross section view of the exemplary embodiment of the slider of FIG. 5 taken along line 6-6.

FIGS. 5 and 6 are cross-sectional views of the slider 300 shown in FIG. 4, taken along the 5-5 and 6-6 in FIG. 4, respectively. For clarity, the step heights are not to scale but rather are exaggerated so as to be easily discernible. Now referring additionally to FIGS. 5 and 6, the trailing pad 322 and the leading pad 342 includes surfaces that are not recessed and instead establishes an air bearing surface datum plane (referred above as the "plane") 500, from which the recession of other surfaces of the slider 300 that are parallel to the plane 500 may be measured.

In the exemplary embodiment of FIGS. 5 and 6, the pit 350 includes a surface in a plane 510 that is recessed relative to the plane 500/air bearing surface by a recession depth 560. The sub-ambient pressure cavities 320 each include a surface in the plane 510 by a deep cavity recession depth 560. The pit 350 depth and the sub-ambient pressure cavities 320 depth are discussed above. The deep portions 334 of the stepped pressure cavities 318 include a surface in the plane 510. The shallow portion 336 of the stepped pressure cavities 318 include a surface in an intermediate plane 520 that lies between the plane 500 and the plane 510, and that is recessed from the plane 500 by a recession depth 570. The depth of both the deep portion 334 and the shallow portion 336 are discussed above.

In the exemplary embodiment of FIGS. 5 and 6, the leading pressurizing steps 348 and the secondary leading pressuring steps 349 may each include a surface in a plane 530 that may lie between the plane 500 and the intermediate plane 520. The plane 530 may be recessed from the primary 500 by depth 580. The depth of the leading pressuring steps 348 and the secondary leading pressuring steps 349 are described above.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f) unless the element is expressly recited using the phrase "means for" or, in the case of a method claim, the element is recited using the phrase "step for."

What is claimed is:

1. A slider for a hard disk drive comprising:
   a leading edge and an opposing trailing edge;
   a leading structure comprising a leading pad having a first air bearing surface portion;
   a first step between the leading edge and the leading pad;
   a trench between the leading edge and the first step;
   a trailing structure having a second air bearing surface portion;

a cavity between the leading structure and the trailing structure;

a second step between the leading pad and the cavity, a portion of the second step being defined by a recessed wall recessed relative to the first air bearing surface portion;

a third step between the leading edge and the leading pad; and a second trench between the leading edge and the third step, wherein the leading structure has one or more interior walls defining a pit therein, and wherein the recessed wall defines a portion of the pit.

2. A slider for a hard disk drive comprising:

a leading edge and an opposing trailing edge;

a leading structure comprising a leading pad having a first air bearing surface portion;

a first step between the leading edge and the leading pad;

a trench between the leading edge and the first step;

a trailing structure having a second air bearing surface portion, the trailing structure comprising at least one stepped cavity having a first portion and a second portion, wherein the first portion is more recessed relative to the second air bearing surface portion than the second portion;

a cavity between the leading structure and the trailing structure; and a second step between the leading pad and the cavity, a portion of the second step being defined by a recessed wall recessed relative to the first air bearing surface portion, wherein the leading structure has one or more interior walls defining a pit therein, and wherein the recessed wall defines a portion of the pit.

3. A hard disk drive comprising:

a rotatable magnetic recording disk; and a slider for use with the magnetic recording disk, the slider comprising:

a leading edge and an opposing trailing edge;

a leading structure comprising a leading pad having a first air bearing surface portion;

a first step between the leading edge and the leading pad;

a trench between the leading edge and the first step;

a trailing structure having a second air bearing surface portion;

a cavity between the leading structure and the trailing structure; and a second step between the leading pad and the cavity, a portion of the second step being defined by a recessed wall recessed relative to the first air bearing surface portion;

a third step between the leading edge and the first air bearing surface portion; and a second trench between the leading edge and the third step, wherein the leading structure has one or more interior walls defining a pit therein, and wherein the recessed wall defines a portion of the pit.

4. A hard disk drive comprising:

a rotatable magnetic recording disk; and a slider for use with the magnetic recording disk, the slider comprising:

a leading edge and an opposing trailing edge;

a leading structure comprising a leading pad having a first air bearing surface portion;

a first step between the leading edge and the leading pad;

a trench between the leading edge and the first step;

a trailing structure having a second air bearing surface portion, the trailing structure comprising at least one stepped cavity having a first portion and a second portion, and wherein the first portion is more recessed relative to the second air bearing surface portion than the second portion;

a cavity between the leading structure and the trailing structure; and a second step between the leading pad and the cavity, a portion of the second step being defined by a recessed wall recessed relative to the first air bearing surface portion, wherein the leading structure has one or more interior walls defining a pit therein, and wherein the recessed wall defines a portion of the pit.

5. A slider for a hard disk drive comprising:

a leading edge and an opposing trailing edge;

a first lateral edge extending from the leading edge to the trailing edge;

a second lateral edge extending from the leading edge to the trailing edge, the second lateral edge opposing the first lateral edge;

a width extending from the first lateral edge to the second lateral edge along a lateral axis, a leading structure comprising a leading pad having a first air bearing surface portion;

a first step between the leading edge and the leading pad;

a trench between the leading edge and the first step;

a trailing structure having a second air bearing surface portion;

a cavity between the leading structure and the trailing structure; and a second step between the leading pad and the cavity, a portion of the second step being defined by a recessed wall recessed relative to the first air bearing surface portion, wherein the leading structure has one or more interior walls defining a pit therein, wherein the recessed wall defines a portion of the pit, and wherein the pit is approximately centered along the width.

6. The slider of claim 5, wherein the pit is recessed relative to the first air bearing surface portion by at least about 600 nm.

7. The slider of claim 5, wherein the leading pad defines at least three sides of the pit.

8. The slider of claim 5, wherein the second step defines at least two sides of the pit.

9. The slider of claim 8, wherein the pit comprises a polygon shape.

10. The slider of claim 9, wherein the polygon shape comprises an irregular hexagon.

11. The slider of claim 5, wherein the trench is adjacent the pit.

12. The slider of claim 11, wherein the trench is recessed relative to the first air bearing surface portion by at least about 600 nm.

13. The slider of claim 5, further comprising:

a third step between the leading edge and the leading pad; and a second trench between the leading edge and the third step.

14. The slider of claim 5, wherein the trailing structure further comprises at least one stepped cavity having a first portion and a second portion and wherein the first portion is more recessed relative to the second air bearing surface portion than the second portion.

15. The slider of claim 14, wherein the first portion is recessed relative to the second air bearing surface portion by at least about 500 nm and the second portion is recessed from the second air bearing surface portion by at least about 300 nm.

16. A hard disk drive comprising:
a rotatable magnetic recording disk; and
a slider for use with the magnetic recording disk, the slider comprising:
  a leading edge and an opposing trailing edge;
  a first lateral edge extending from the leading edge to the trailing edge;
  a second lateral edge extending from the leading edge to the trailing edge, the second lateral edge opposing the first lateral edge;
  a width extending from the first lateral edge to the second lateral edge along a lateral axis,
  a leading structure comprising a leading pad having a first air bearing surface portion;
  a first step between the leading edge and the leading pad;
  a trench between the leading edge and the first step;
  a trailing structure having a second air bearing surface portion;
  a cavity between the leading structure and the trailing structure; and
  a second step between the leading pad and the cavity, a portion of the second step being defined by a recessed wall recessed relative to the first air bearing surface portion,
wherein the leading structure has one or more interior walls defining a pit therein,
wherein the recessed wall defines a portion of the pit, and
wherein the pit is approximately centered along the width.

17. The hard disk drive of claim 16, wherein the pit is recessed relative to the first air bearing surface portion by at least about 600 nm.

18. The hard disk drive of claim 16, wherein the leading pad defines at least three sides of the pit.

19. The hard disk drive of claim 16, wherein the second step defines at least two sides of the pit.

20. The hard disk drive of claim 19, wherein the pit comprises a polygon shape.

21. The hard disk drive of claim 20, wherein the polygon shape comprises an irregular hexagon.

22. The hard disk drive of claim 16, wherein the trench is adjacent the pit.

23. The hard disk drive of claim 22, wherein the trench is recessed relative to the first air bearing surface portion by at least about 600 nm.

24. The hard disk drive of claim 16, wherein the slider further comprises:
  a third step between the leading edge and the first air bearing surface portion; and
  a second trench between the leading edge and the third step.

25. The hard disk drive of claim 16, wherein the trailing structure further comprises at least one stepped cavity having a first portion and a second portion, and wherein the first portion is more recessed relative to the second air bearing surface portion than the second portion.

26. The hard disk drive of claim 25, wherein the first portion is recessed relative to the second air bearing surface portion by at least about 500 nm and the second portion is recessed relative to the second air bearing surface portion by at least about 300 nm.

27. The slider of claim 5, wherein the trench is more recessed relative to the first air bearing surface portion than the first step and the second step.

28. The hard disk drive of claim 16, wherein the trench is more recessed relative to the first air bearing surface portion than the first step and the second step.

* * * * *